(12) United States Patent
Loh et al.

(10) Patent No.: US 6,993,647 B2
(45) Date of Patent: Jan. 31, 2006

(54) METHOD AND APPARATUS FOR BOOTING AN ELECTRONIC DEVICE USING A PLURALITY OF AGENT RECORDS AND AGENT CODES

(75) Inventors: Thiam Wah Loh, Singapore (SG); Khiam Yong Tan, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 755 days.

(21) Appl. No.: 09/927,150

(22) Filed: Aug. 10, 2001

(65) Prior Publication Data

US 2003/0093661 A1   May 15, 2003

(51) Int. Cl.
 G06F 15/177  (2006.01)
 G06F 9/00    (2006.01)
 G06F 9/44    (2006.01)
 G06F 9/445   (2006.01)
(52) U.S. Cl. .............................. 713/2; 713/1; 713/100; 717/168
(58) Field of Classification Search .................... 713/1, 713/2, 100
See application file for complete search history.

(56) References Cited

U.S. PATENT DOCUMENTS

| | | | | |
|---|---|---|---|---|
| 5,230,052 A | * | 7/1993 | Dayan et al. ................... | 713/2 |
| 5,960,445 A | * | 9/1999 | Tamori et al. .................. | 713/2 |
| 5,964,873 A | * | 10/1999 | Choi .............................. | 713/2 |
| 6,105,130 A | * | 8/2000 | Wu et al. ....................... | 713/2 |
| 6,167,532 A | * | 12/2000 | Wisecup ...................... | 714/23 |
| 6,205,548 B1 | * | 3/2001 | Hasbun ......................... | 713/2 |
| 6,308,265 B1 | * | 10/2001 | Miller ........................... | 713/2 |
| 6,446,203 B1 | * | 9/2002 | Aguilar et al. ................. | 713/2 |
| 6,665,813 B1 | * | 12/2003 | Forsman et al. .............. | 714/15 |

\* cited by examiner

Primary Examiner—Lynne H. Browne
Assistant Examiner—James K. Trujillo

(57) ABSTRACT

A method for executing an agent code, wherein the agent code is saved in a read only memory, wherein an agent record containing data is saved in an erasable and programmable memory device, and wherein the method comprises the following steps: reading the agent code from the read only memory and loading it into a processing device, executing the agent code, thereby initiating reading the agent record from the erasable and programmable memory device and loading it into the processing device, and executing the agent record in the processing device.

8 Claims, 1 Drawing Sheet

METHOD AND APPARATUS FOR BOOTING AN ELECTRONIC DEVICE USING A PLURALITY OF AGENT RECORDS AND AGENT CODES

BACKGROUND OF THE INVENTION

The invention relates to an Eeprom agent record.

An electronic device as usually used in many modern electronic based apparatuses like a computer device is generally operated by an electronic operating system. For its function the electronic device needs power. When switching on the power for the electronic device, usually the operating system has to be booted up in a boot-up process. Usually the basic information about the electronic device and the operating system is saved in a non-volatile read only memory, which was manufactured corresponding to the required demands. During the boot-up process the registers of the electronic device are initiated.

Common read only memories in modern electronic based apparatuses are realized by semiconductor memory devices. Each semiconductor memory device comprises several memory units, which are arranged in at least one memory matrix. The memory units comprise semiconductor components, which are built invariably into the memory matrix corresponding to the hardwired programming of the read only memory. The semiconductor components are located on semiconductor chips and can be manufactured with generally known semiconductor fabrication techniques. One of the main semiconductor fabrication techniques is lithography. During different lithographic processes the semiconductor components are formed by means of masks corresponding to the information, which has to be saved in the read only memory.

An electronic device with a read only memory has some disadvantages. The most disadvantages refer to the costly production of the read only memory. Therefore, the production of read only memory has to be performed very exactly. If an error or failure occurs during planning or producing the read only memory, the whole production process has to be stopped, new masks have to be made and a new production series has to be started. The faulty read only memories are useless and have to be scrapped.

A similar problem occurs, if the electronic device is updated and therefore the information in the read only memory has to be changed. Then, the current read only memory has to be scrapped and replaced by a newly produced read only memory according to the updated electronic device.

SUMMARY OF THE INVENTION

One main aspect of the invention is to provide a possibility to initiate an action prescribed by an agent record by an agent code saved in a read only memory without the need of a costly remasking and newly producing of the read only memory for, e.g., a correction of register values inside a processing device. An agent code according to this document is mainly a piece of code, which will be embedded in a boot-up process in anticipation for a need to change the boot-up process. The boot-up process can be changed according to information comprised in the agent record. In the boot-up process, for instance, a register value or register settings may be changed, or further code may be executed or corrected.

A method, a boot-up process and an electronic device according to the independent claims of the invention enable a correction of register values inside a processing device according to an agent record saved in an erasable and programmable memory device.

A method for executing an agent code, wherein the agent code is saved in a read only memory, wherein an agent record containing data is saved in an erasable and programmable memory device, and wherein the method comprises the following steps: reading the agent code from the read only memory and loading it into a processing device, executing the agent code, thereby initiating reading the agent record from the erasable and programmable memory device and loading it into the processing device, and executing the agent record in the processing device.

A boot-up process for booting up a processing device, wherein an agent code is saved in a read only memory, wherein the agent code contains a first agent record identification code, wherein a plurality of agent records each containing a second agent record identification code, a register identification code and data is saved in an erasable and programmable memory device, and wherein the boot-up process comprises the following steps: initializing a plurality of registers in the processing device, reading and executing the agent code, thereby reading the plurality of agent records and checking as to whether a match between a second agent record identification code and the first agent record identification code exists and, for the case that a match is found to exist, assigning the data of the matching agent record to a specified register according to the register identification code of the matching agent record.

An electronic device for executing agent code comprising a read only memory, an erasable and programmable memory device, and a processing device, wherein the agent code is saved in the read only memory and an agent record containing data is saved in the erasable and programmable memory device, the processing device being designed such that it can perform the following steps: reading the agent code from the read only memory and loading it into a processing device, executing the agent code, thereby initiating reading the agent record from the erasable and programmable memory device and loading it into the processing device, and executing the agent record in the processing device.

DETAILED DESCRIPTION OF A PREFERRED EMBODIMENT OF THE INVENTION

A preferred embodiment of the invention will now be described with reference to the attached drawings in which like parts or elements are denoted by like reference numbers.

Figure 1:
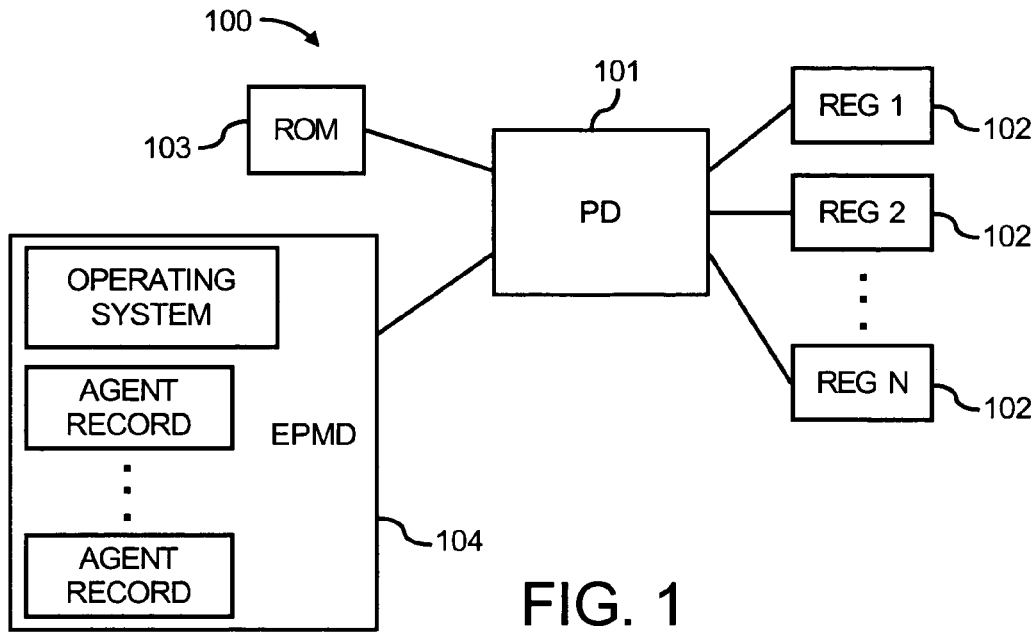
FIG. 1 shows an electronic device 100 according to a preferred embodiment of the invention.

FIG. 1 shows an electronic device 100 according to a preferred embodiment of the invention. The electronic device 100 includes a processing device (PD) 101, a read only memory (ROM) 102 and an erasable and programmable memory device (EPMD) 104, according to this embodiment an EEPROM (Electrical Erasable Programmable Read Only Memory). The read only memory 103 and the erasable and programmable memory device 104 are electronically connected with the processing device 101.

During the boot-up process of the processing device 101 the registers 102 of the processing device 101 are initialized, that is, given values are assigned to the registers 102. The registers 102 of the processing device can be parts of the central processing unit (CPU), of application specific integrated circuits (ASIC) or of synchronous dynamic random access memories (SDRAM). Further, an agent code is executed by the boot-up process to provide an opportunity to fix problems, if any, or to perform extra functions during the boot-up process. The agent code is saved in the read only memory 103. In the erasable and programmable memory device 104 an agent record is saved, which is necessary for correcting register values. The agent record includes an agent record identification code, an agent record length, and data. The agent record length is an information about the size of the data. And the data prescribes an action to be taken. The data can be instructions, or values to be reassigned to, for example, the registers 102.

An example of correcting register values during the boot-up process is first provided. In that case, the data of the agent record includes two parts: a register identification code and content. The register identification code gives an information about which register the content belongs to, and can be an address offset. The content includes vaues to be written to the register identified by the register identification code.

After switching-on the power for the processing device 101 a boot-up process starts processing in the processing device 101. The processing device 101 includes preferably a random access memory (RAM). During the boot-up process the N registers 102 of the processing device 101, for example the CPU registers and ASIC registers, are initialized. This means, that given values are assigned to some or all of these registers 102. Then, the boot-up process executes the command to read the agent code from the read only memory 103 and to load it into the random access memory. The agent code includes a specific agent record identification code (ID). Further, the agent code as part of the boot-up process reads a specific agent record with a matching agent record identification code from the erasable and programmable memory device 104 and to load it into the random access memory. Now the agent record is executed in the processing device 101 by the boot-up process. According to the register identification code of the agent record, which indicates a specific register 102, the data being part of the agent record are assigned to the specific register 102 predetermined by the register identification code. This becomes more clear in consideration with FIG. 2.

An exemplary agent code written in BASIC fro performing the function described above is hereto enclosed:

Sub agentcode1( )
Dim Agent_id As Byte
Dim Agent_recodesize As Byte
Dim Offset As Byte 'the offset from the base address of EEPROM where the agent ID is located

```
Dim EEPROM(256) As Byte
Dim asicregisters(256) As Integer
Offset = 42
SizeOfEeprom = 256
    EndOfAgentRecords = 255
    IdOfThisAgent = 1
    While (Offset < SizeOfEeprom)
    Agent_id = EEPROM(Offset)
        While (Agent_id <> EndOfAgentRecords)
            If Agent_id = IdOfThisAgent Then
                asicregisters(EEPROM(Offset + 2) * 256 + EEPROM(Offset + 3)) =
EEPROM(Offset + 4) * 256 + EEPROM(Offset + 5)
            Else
                Offset = Offset + EEPROM(Offset + 1) + 1 'calc the new offset to the next
agent record ID
            End If
        Wend
    Wend
End Sub
```

Figure 2:
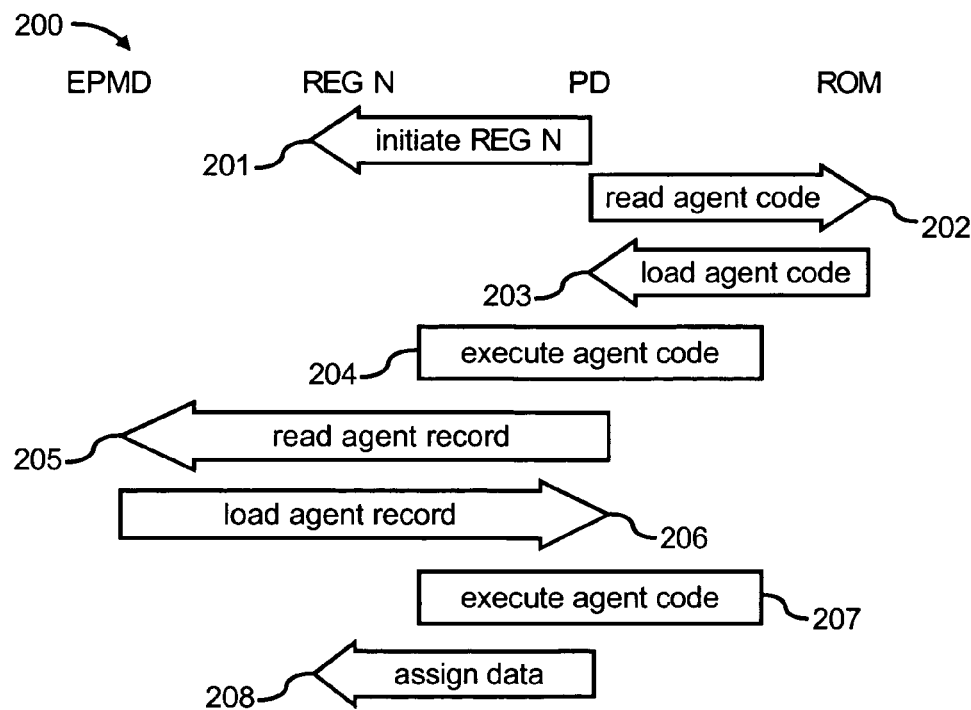
FIG. 2 shows a message flow diagram 200 of the electronic device 100 according to the preferred embodiment of the invention.

FIG. 2 shows a message flow diagram 200 of the electronic device 100 according to the preferred embodiment of the invention. First, the boot-up process running in the processing device PD initializes the N registers (REG N) 201, wherein given values are assigned to some or all of the registers REG N. Then, the boot-up process executes the command "read agent code" 202 at the read only memory ROM. Next, the read only memory ROM provides the agent code to the processing device PD, which is loading the agent code 203. Afterwards, the boot-up process executes the agent code 204 and accordingly the command "read agent record" 205 at the erasable and programmable memory device EPMD. If an agent record with an appropriate agent record identification code is saved in the erasable and programmable memory device EPMD, the agent record is provided to the processing device PD, which loads the agent record 206. Finally, the boot-up process executes the agent record 207, i.e., the data of the agent record 208 are assigned according to the register identification code of the agent record to an identified register REG N.

Another example of agent record is also provided. After re-assigning the register values, the boot-up process is further processed. For example, an phase-locked loop (PLL) initialization routine can be loaded into the random access memory (RAM) of the processing device PD as defined by the boot-up process. Then, a further agent code can be executed to initiate an appropriate agent record for correcting the PLL routine. Afterwards, the PLL routine can be executed and the processing device PD is switched into higher speed.

The content of the erasable and programmable memory device EPMD can have the following illustrative format:

| Address (byte): | Size (byte): | Description: |
|---|---|---|
| 0 | 2 | Device identification code (ID) |
| 2 | 10 | Password |
| 12 | 10 | User name |
| 22 | 20 | Device management data |
| 42 | variable | Agent record 1 |
| | | Agent record 2 |
| | | Agent record 3 |
| | | ... |
| 256 | | End of EPMD |

Further, the agent record can have the following illustrative format:

| Field name: | Size (byte): | Description: |
|---|---|---|
| Agent record ID | 1 | Unique ID that identifies the agent code. The boot-up process checks this field to decide if this agent record belongs to the actually executed agent code. |
| Size of agent record | 1 | The size of the following data field. |
| Agent data | variable (from 1 to 255) | Specific data for this agent code. |

The agent data comprise an address offset and the real data. The address offset has to be added to the ASIC base address for receiving the final register identification code. The real data are the values which have to be written to the ASIC register specified by the register identification code. Both, the address offset and the real data, have a field size of two byte according to this embodiment of the invention.

An example of the agent record can be found in the following:

| Field name: | Size (byte): | Content: | Description: |
|---|---|---|---|
| Agent record ID | 1 | 0x1 | Indicates agent code 1. |
| Size of agent record | 1 | 0x4 | |
| Agent data | 4 | 0x00121234 | An address offset of 12 has to be added to the ASIC base address for receiving the register identification code. The real data to be written to the identified register are 0x1234. |

What is claimed is:

1. A method for executing a plurality of agent codes in a computer device, wherein the plurality of agent codes are saved in a read only memory, wherein a plurality of agent records containing data are saved in an erasable and programmable memory device, and wherein the method comprises:

initializing a plurality of registers, reading a first agent code of the plurality of agent codes from the read only memory and loading the first agent code into a processing device, wherein the computer device includes the read only memory, the erasable and programmable memory device, and the processing device, in the computer device, executing the first agent code, wherein the first agent code includes a first agent record identification code, which includes a register identification code, thereby initiating reading a first agent record of the plurality of agent records with a matching agent record identification code from the erasable programmable memory device and loading the first agent record into the register of the processing device that is identified by the register identification code of the read first agent record, executing the first agent record in the processing devices, reading a second agent code of the plurality of agent codes from the read only memory and loading the second agent code into the processing device, wherein the second agent code is different from the first agent code, in the computer device, executing the second agent code, wherein the second agent code includes a second agent record identification code, which includes a register identification code, thereby initiating reading a second agent record of the plurality of agent records with a matching agent record identification code from the erasable programmable memory device and loading the second agent record into the register of the processing device that is identified by the register identification code of the read second agent record, executing the second agent record in the processing device, wherein the second agent record is different from the first agent record.

2. The method according to claim 1, wherein executing the first agent record containing instructions and data is performed by adding the data of the first agent record to a specified register of the processing device according to the instructions of the first agent record.

3. The method according to claim 1, wherein the processing device is realized by a central processing unit part of the computer device, wherein the first agent code is realized by an operating system for the computer device, wherein the first agent record contains instructions and data, and wherein executing both, the first agent code and the first agent record, is realized by a boot-up process of the computer device.

4. The method according to claim 3, wherein the data of the first agent record correct at least one sequence in a specified register of the computer device according to the instructions of the first agent record.

5. The method according to claim 3, wherein the data of the first agent record add at least one sequence to a specified register of the computer device according to the instructions of the first agent record.

6. A boot-up process for booting up a processing device of a computer device, said computer device including a read only memory and an erasable and programmable memory device, wherein a plurality of agent codes are saved in the read only memory, wherein the plurality of agent codes each containing a first agent record identification code, wherein a plurality of agent records each containing a second agent record identification code, a register identification code and data is saved in the erasable and programmable memory device, and wherein the boot-up process comprises the following steps:

initializing a plurality of registers in the processing device, in the computer device, reading and executing a first agent code of the plurality of agent codes, and reading the plurality of agent records and checking as to whether a match between a second agent record identification code and the first agent record identification code of the first agent code exists, for the case that a match is found to exist, assigning the data of the matching agent record to a specified register according to the register identification code of the matching agent records, in the computer device, reading and executing a second agent code of the plurality of agent codes different from the first agent code, and reading the plurality of agent records again and checking as to whether a match between another second agent record identification code and the first agent record identification code of the second agent code exists, and for the case that another match is found to exist, assigning the data of the another matching agent record to a specified register according to the register identification code of the another matching agent record.

7. An electronic device for executing a plurality of agent codes comprising a read only memory, an erasable and programmable memory device, and a processing device, wherein the plurality of agent codes are saved in the read only memory and a plurality of agent records containing data are saved in the erasable and programmable memory device, the processing device being configured to perform the following steps:

reading a first agent code of the plurality of agent codes from the read only memory and loading it into the processing device, executing the first agent code, thereby initiating reading a first agent record of the plurality of agent records from the erasable and programmable memory device and loading the first agent record into the processing device, executing the first agent record in the processing device, reading a second agent code of the plurality of agent codes different from the first agent code from the read only memory and loading it into the processing device, executing the second agent code, thereby initiating reading a second agent record of the plurality of agent records from the erasable and programmable memory device and loading the second agent record into the processing device, and executing the second agent record in the processing device.

8. The electronic device according to claim 7, wherein the electronic device comprises a computer device, wherein the processing device is realized by a central processing unit part of the computer device, wherein the first agent code is realized by an operating system for the computer device, and wherein executing both, the first agent code and the first agent record, is realized by a boot-up process of the computer device.

* * * * *